(12) United States Patent
Sasaki

(10) Patent No.: US 6,881,765 B2
(45) Date of Patent: Apr. 19, 2005

(54) CURABLE RELEASE AGENT AND SEPARATOR USING SAME

(75) Inventor: Hiroshi Sasaki, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 90 days.

(21) Appl. No.: 10/383,579

(22) Filed: Mar. 10, 2003

(65) Prior Publication Data

US 2004/0180982 A1 Sep. 16, 2004

(51) Int. Cl.$^7$ .................. C08G 65/18; C08G 77/46; B32B 27/10; B32B 33/00
(52) U.S. Cl. .................. 522/167; 522/170; 428/40.1; 428/41.8; 428/447; 528/27
(58) Field of Search .................. 522/167, 170, 522/148; 528/27; 428/40.1, 41.8, 447, 345, 352

(56) References Cited

U.S. PATENT DOCUMENTS

| | | | | |
|---|---|---|---|---|
| 4,026,705 | A | * 5/1977 | Crivello et al. | 430/280.1 |
| 5,376,420 | A | * 12/1994 | Yamamoto et al. | 428/41.4 |
| 5,910,370 | A | * 6/1999 | Katsura et al. | 428/425.5 |
| 6,498,200 | B1 | * 12/2002 | Suzuki et al. | 522/13 |
| 2003/0199661 | A1 | * 10/2003 | Frances | 528/27 |
| 2004/0110860 | A1 | * 6/2004 | Frances | 522/148 |

FOREIGN PATENT DOCUMENTS

| | | | |
|---|---|---|---|
| JP | 47-34447 B | | 11/1972 |
| JP | 52-040918 A | | 3/1977 |
| JP | 01-297421 A | | 11/1989 |
| JP | 01-311103 A | | 12/1989 |
| JP | 11199853 A | * | 7/1999 |
| JP | 2000212443 A | * | 8/2000 |
| JP | 2000-265153 A | | 9/2000 |
| JP | 2004043609 A | * | 2/2004 |
| WO | WO 01/30930 A1 | * | 5/2001 |
| WO | WO 01/38450 A1 | * | 5/2001 |

OTHER PUBLICATIONS

Hiroshi Sasaki, Application of Oxctane Monomers for UV–Curable Materials, RadTech (Apr. 28–May 1, 2002) Technical Conference Proceedings pp. 64–78.

* cited by examiner

Primary Examiner—Susan Berman
(74) Attorney, Agent, or Firm—Sughrue Mion, PLLC

(57) ABSTRACT

A radiation curable composition is provided which includes a polyorganosiloxane containing at least two ring-opening polymerizable cyclic ether groups in the molecule and having 10 to 1,000 silicon atoms as a radiation reactive polymer; a monofunctional oxetane monomer containing in the molecule one oxetanyl group and a straight- or branched-chain alkyl group having 6 to 18 carbons as a diluent; and a cationic polymerization initiator. There is also provided a process for producing a separator by coating a surface of a substrate with the above radiation curable composition and then curing the composition by exposure to radiation. A separator obtained by the above process is also provided.

20 Claims, No Drawings

CURABLE RELEASE AGENT AND SEPARATOR USING SAME

BACKGROUND OF THE INVENTION

1. Field of the Invention

The present invention relates to a novel radiation curable release agent and, more particularly, a radiation curable silicone release agent that has low viscosity even without a solvent, excellent thin film coating performance and, furthermore, an excellent cure rate and excellent release properties. Moreover, the present invention relates to a separator using this release agent.

2. Description of the Related Art

It is well known that forming a coating by curing, on the surface of a substrate such as paper of various types, synthetic film, or a textile, a composition containing as a main component a polyorganosiloxane, imparts release properties to the coating with respect to tacky materials.

With regard to such silicone release agents, those that are cured by a condensation reaction (ref. JP-A-47-34447 (JP-A denotes a Japanese unexamined patent application publication), etc.), and those that are cured by an addition reaction (ref. JP-B-52-40918 (JP-B denotes a Japanese examined patent application publication), etc.) are known. In order to carry out these curing reactions it is necessary to apply heat, and there is therefore the drawback that the application thereof is limited to substrates that can withstand the curing temperature.

In order to eliminate this drawback of thermosetting type silicone release agents, various types of ultraviolet curable silicone compositions have been developed (ref. JP-A-1-297421 and JP-A-1-311103). These methods have the advantages that the curing time is usually short, and substrates that are susceptible to damage by thermal energy can be employed since curing is carried out, without heating, by ultraviolet irradiation after coating.

With regard to conventional ultraviolet curable silicones, a variety of curing modes have been proposed. Among them, a type in which a polyorganosiloxane having an epoxy group or a vinyl ether group in the molecule is cured by a reaction involving ultraviolet radiation in the presence of a cation-generating type catalyst is excellent since the curing thereof is not inhibited by oxygen and there is no unpleasant odor, and the use thereof is being widely investigated.

In general, in the case where a polyorganosiloxane composition that is cured by ultraviolet radiation is used as the release agent, in order to meet various requirements for the properties of the release agent such as coating performance, coating formation properties, and release properties, it is necessary to take into consideration the molecular structure, the molecular weight, etc. of a photoreactive polymer. With regard to conventional ultraviolet curable release agents having an oxirane functional group such as glycidoxy or 3,4-epoxycyclohexyl that have been proposed as photo-cationic curing type release agents, it is difficult to obtain a cured coating exhibiting a low release force. In particular, in the case of a glycidoxy group, since the curing speed is slow, recent demand for a high curing speed in order to increase the productivity cannot be fulfilled satisfactorily. In the case of a vinyl ether functional group, synthesis of a photoreactive polymer is complicated, and is undesirable in terms of cost. With respect to the reactive groups, it has also been suggested as disclosed in, for example, JP-A-12-265153 that the release properties and the curing properties can be adjusted and improved by introducing an oxetanyl group into a silicone molecule.

In general, when coating the release agent it is necessary to make the coated film very thin. Although conventional release agents have comparatively low viscosities, since it is difficult to form a coating having a thickness of 1 μm or less without using a solvent, they are often diluted with an organic solvent for coating, thus causing environmental issues due to discharge of the organic solvent.

BRIEF SUMMARY OF THE INVENTION

It is therefore an object of the present invention to provide a radiation curable silicone release agent that is free from the various restrictions that conventional ultraviolet curable silicone release agents have, has good curing properties, good adhesion, good coating formation properties, good release properties, low viscosity, and excellent thin film coating performance; and a separator using same.

As a result of an intensive investigation by the present inventor in order to achieve the above-mentioned object, it has been found that the target release agent can be attained by a radiation curable composition comprising a polyorganosiloxane containing at least two ring-opening polymerizable cyclic ether groups in the molecule as a radiation reactive polymer, a monofunctional oxetane monomer containing in the molecule one oxetanyl group and a straight- or branched-chain alkyl group having 6 to 20 carbons as a diluent, and a cationic polymerization initiator, and the present invention has thus been accomplished.

That is, the radiation curable composition of the present invention comprises:

(A) a polyorganosiloxane represented by the average unit formula below:

$$(R_1)_m(R_2)_n SiO_{(4-m-n)/2} \qquad (1)$$

(in formula (1), the $R_1$ groups each denote a substituted or unsubstituted monovalent hydrocarbon group having no cationic ring-opening polymerizable group, the hydrocarbon groups may be identical to or different from each other, and a part thereof may be a hydrogen atom, a hydroxyl group, or an alkoxyl group having 1 to 4 carbons; the $R_2$ groups each denote an alkyl group to which is bonded a cyclic ether group having cationic ring-opening polymerizability, the alkyl groups may be identical to or different from each other, and they may have an alicyclic alkyl group; n is 0.0004 to 1.0; and m is a figure such that the total of m+n is 1.2 to 2.2), the polyorganosiloxane having at least two cationic ring-opening polymerizable cyclic ether groups in the molecule, and the number of silicon atoms in the polyorganosiloxane being 10 to 1,000;

(B) a monofunctional oxetane monomer represented by formula (2) below:

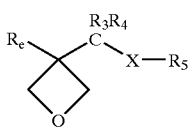

(In formula (2), $R_3$ and $R_4$ denote hydrogen atoms or straight- or branched-chain alkyl groups having 1 to 4 carbons, which may have a substituent, $R_5$ denotes a straight- or branched-chain alkyl group having 6 to 18 carbons, $R_6$ denotes a hydrogen atom or an alkyl group having 1 to 4 carbons, and X denotes methylene or an oxygen atom); and (C) a cationic polymerization initiator.

DETAILED DESCRIPTION OF THE INVENTION

The present invention is explained in detail below.

The polyorganosiloxane (A) having a cyclic ether group (hereinafter called component (A)) is a polyorganosiloxane having at least two ring-opening polymerizable cyclic ether groups in the molecule, and has the average unit formula below.

(In formula (1), $R_1$, $R_2$, m, and n are as defined above.)

The hydrocarbon groups denoted by $R_1$ preferably have 1 to 18 carbons, and more preferably 1 to 12 carbons and, as described in detail later, examples thereof include an alkyl group, a cycloalkyl group, an alkylene group, an aryl group, and an aralkyl group. The alkyl groups denoted by $R_2$, to which are bonded cyclic ether groups, preferably have 1 to 12 carbons.

Component (A) is now explained in detail.

The siloxane framework of formula (1) may be a straight- or branched-chain, and the entire molecule or parts thereof may form a cyclic or network-like siloxane framework. The straight- or branched-chain framework is preferable since the cured release agent exhibits excellent physical properties.

The $R_1$ groups in formula (1) are substituted or unsubstituted monovalent hydrocarbon groups that are bonded to the silicon atom, have no ring-opening polymerizable group, and may be identical to or different from each other, and examples thereof include alkyl groups having 1 to 18 carbons such as methyl, ethyl, propyl, butyl, pentyl, hexyl, octyl, decyl, and dodecyl; cycloalkyl groups having 6 to 12 carbons such as cyclohexyl and cyclohexylmethyl; alkenyl groups having 2 to 12 carbons such as vinyl and allyl; aryl groups having 6 to 12 carbons such as phenyl and tolyl; aralkyl groups having 8 to 12 carbons such as 2-phenylethyl and 2-phenylpropyl; and the above hydrocarbon groups in which some of the hydrogen atoms are replaced with another atom or group including an alkyl group having 1 to 4 carbons such as methyl, ethyl, or propyl, which may be present in combination. It is also possible for a hydrogen atom, a hydroxyl group, or an alkoxyl group having 1 to 4 carbons such as methoxy, ethoxy, propoxy, or butoxy to be bonded as a part of $R_1$; they can be intentionally introduced as a molecular terminal group, etc., they may be formed while synthesizing the molecule of formula (1), or they may remain when introducing $R_2$ into the molecule of formula (1). Among these groups, in terms of ease of synthesis, comparatively low viscosity for the molecular weight of component (A), ease of handling of the composition prior to curing, and good release properties of the cured release agent, at least 85% of the entire $R_1$ groups are preferably methyl, and particularly preferably most of the $R_1$ groups are methyl.

The $R_2$ groups in formula (1) are groups that contain a cationic ring-opening polymerizable group whose carbon atom is bonded to a silicon atom, and they may be identical to or different from each other; that is, alkyl groups having 1 to 12 carbons and containing an oxirane or an oxetanyl group, the alkyl groups optionally having an alicyclic alkyl group. Examples thereof include a glycidoxy group, a cyclohexeneoxide group, and a methyloxetanyl group. A 2-(3,4-epoxycyclohexyl)ethyl group, etc. is preferable since excellent curing properties and excellent release properties can be achieved.

The average unit formula of the entire polyorganosiloxane can be represented by the above formula (1), and m is a figure such that the total of m+n is 1.2 to 2.2. When m is less than 1.2 the release properties might not be satisfactory, and when m exceeds 2.2 the release properties of the cured coating obtained also tend to be poor. Moreover, n is in the range of 0.0004 to 1.0, and preferably 0.001 to 0.4.

Since component (A) forms a network structure by the effect of radiation such as, for example, ultraviolet radiation, a composition containing component (A) exhibits excellent curing properties. Furthermore, in order to form, on the surface of a substrate, a cured coating having excellent release properties, there are at least two ring-opening polymerizable groups per molecule. In order for the cured coating to exhibit a low release force, the proportion of $R_2$-containing siloxane units in the total of the siloxane units in component (A) is preferably at most 80 mol %.

The number of silicon atoms in component (A) comprising such a combination of siloxane units is on average 10 to 1,000, and preferably is in the range of 10 to 500. When the number of silicon atoms is less than 10 on average, there are cases in which a cured coating having release properties cannot be obtained. On the other hand, when it exceeds 1,000, the viscosity of the release agent increases; not only does it become difficult to apply it without a solvent, but also the cured coating thus obtained has poor release properties and migration from the cured coating to another substrate becomes noticeable, which is a problem.

The viscosity of component (A) at 25° C. is preferably in the range of 5 to 10,000 mPa·s, and more preferably in the range of 5 to 1,000 mPa·s, because coating is easy without a solvent, no gel is formed during a radiation curing reaction, and a coating with good release properties can be obtained.

The monofunctional oxetane monomer (B) (hereinafter called component (B)) is represented by the above formula (2), and is a component used for adjusting the viscosity of the composition and the release properties of the cured coating. Formula (2) has one straight- or branched-chain alkyl group and one oxetanyl group. In formula (2), $R_3$ and $R_4$ denote hydrogen atoms or alkyl groups having 1 to 4 carbons, which may have a substituent, and examples of the substituted alkyl groups include haloalkyl groups having 1 to 4 carbons such as chloromethyl, 3-chloropropyl and 3,3,3-trifluoropropyl. $R_5$ denotes a straight- or branched-chain alkyl group having 6 to 18 carbons, $R_6$ denotes a hydrogen atom or an alkyl group having 1 to 4-carbons and is preferably methyl or ethyl, and X denotes methylene or an oxygen atom.

Since such a component used for adjusting the viscosity of the composition and the release properties of the cured coating generally has a comparatively low molecular weight, if this component remains in the polymerization-cured release agent or migrates into a pressure sensitive adhesive, then there is a problem of unpleasant odor, etc. However, since component (B) has an oxetane ring, which is highly cationically polymerizable, such a problem can be greatly reduced. In the present invention, an oxetane compound represented by formula (5) below can be particularly preferably used as component (B).

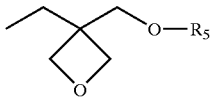
(5)

In the formula, $R_5$ is the same as in formula (2).

The viscosity of component (B) at 25° C. is preferably 50 mPa·s or less.

The cationic polymerization initiator (C) (hereinafter called component (C)) is activated by exposure to radiation to form a cationic component, thus acting to induce cationic ring-opening polymerization of ring-opening polymerizable groups in the composition. Examples of the radiation include ultraviolet radiation, visible light, and an electron beam; it is preferable to use ultraviolet radiation or an electron beam, and it is more preferable to use ultraviolet radiation.

It is possible to use as component (C) any cationic polymerization initiator that is compatible with the composition of the present invention and can be activated by exposure to radiation to thereby induce ring opening of the ring-opening polymerizable groups. Examples of component (C) are described in, for example, 'UV EB Curing Materials' (CMC Publishing Co., Ltd. (1992)). Among such initiators, a diaryliodonium salt or a triarylsulfonium salt is preferable, but the cationic polymerization initiators that can be used here are not limited thereto.

Examples of the ultraviolet radiation cationic polymerization initiator include onium salts and organometallic complexes.

Examples of the onium salts include a diazonium salt, a sulfonium salt, and an iodonium salt. Examples of the organometallic complex include an iron-allene complex, a titanocene complex, and an arylsilanol-aluminium complex. Specifically, Optomer SP-150 (product name, manufactured by Asahi Denka Co., Ltd.), Optomer SP-170 (product name, manufactured by Asahi Denka Co., Ltd.), UVE-1014 (product name, manufactured by General Electric Company), CD-1012 (product name, manufactured by Sartomer), etc. can be used.

Among these ultraviolet radiation cationic initiators, an iodonium salt having an alkyl substituent is preferable since it has excellent compatibility with the composition of the present invention.

In the case where the radiation is visible light or an electron beam, component (C) can be any material as long as it has good compatibility with the composition of the present invention and can be decomposed by irradiation to generate a cation.

A polyfunctional monomer (D) (hereinafter called component (D)) is a component used for adjusting the viscosity of the composition of the present invention and the strength of the cured coating, and is not particularly restricted as long as it has at least two cyclic ether groups per molecule and is compatible with component (A) and component (B). Examples thereof include those generally known as epoxy resins such as a bisphenol A epoxy resin, a bisphenol F epoxy resin, a Novolac epoxy resin, and an alicyclic epoxy resin, and a compound having an oxetanyl group.

It is particularly preferable for component (D) to be a monomer, represented by formula (3) below, having two oxetanyl groups per molecule.

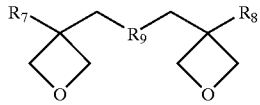
(3)

In formula (3), $R_7$ and $R_8$ denote hydrogen atoms, alkyl groups having 1 to 4 carbons, or substituted hydrocarbon groups, and $R_9$ denotes formula (4) below. The substituted hydrocarbon groups are, for example, haloalkyl groups having 1 to 4 carbons such as chloromethyl, 3-chloropropyl, and 3,3,3-trifluoropropyl.

(4)

In formula (4), k is an integer of 0 to 5, and when k is 1 to 5, $R_{10}$ denotes a straight- or branched-chain hydrocarbon group having 2 to 12 carbons, and preferably ethylene, propylene, or benzenedimethyl.

With regard to component (D), which has two oxetanyl groups per molecule and which is represented by formula (3) above, an aliphatic oxetane compound can be cited, and a preferable example is bis(3-ethyl-3-oxetanylmethyl)ether (OXT-221, manufactured by Toagosei Co., Ltd.), which is represented by formula (6) below.

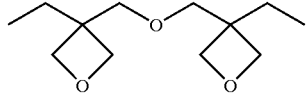
(6)

The mixing ratio of component (D) is preferably 0 to 80 parts by weight relative to 100 parts by weight of the total of component (B) and component (D). When the mixing ratio of component (D) is more than 80 parts by weight, the modulus of elasticity of the cured coating becomes too high, thus making it difficult to achieve light release properties.

A radical polymerization initiator (E) (hereinafter called component (E)) that is used with radiation such as ultraviolet radiation, visible light, or an electron beam can be any material as long as it can be activated by the application of radiation to form a radical component and the radical thus formed can cause a single electron transfer reaction so as to generate a cationic component from the cationic polymerization initiator component (C) present in the system, thereby inducing cationic ring-opening polymerization of the ring-opening polymerizable groups in the composition.

Component (E) can be any photoradical polymerization initiator as long as it is compatible with the composition of the present invention and the radical formed by exposure to radiation can induce a single electron transfer reaction with the photocationic polymerization initiator.

With regard to the initiators that can cause an intramolecular cleavage type reaction involving component (E), there can be cited as examples benzoin ether, benzyl dimethyl ketal, an α-hydroxyalkylphenone, and an acylphosphine oxide.

Among these photocationic initiators, the α-hydroxyalkylphenone is particularly preferable as component (E) since it has excellent compatibility.

The mixing ratio of component (A) is preferably 5 to 80 parts by weight relative to 100 parts by weight of the total of component (A) and component (B), which are materials having a polymerizable group, or the total of component (A), component (B), and component (C). When the mixing ratio of component (A) is less than 5 part by weight, the release properties of the cured coating might deteriorate, and when it is more than 80 parts by weight, the viscosity of the composition is not sufficiently low. The mixing ratio is more preferably 10 to 60 parts by weight.

The mixing ratio of component (B) is preferably 1 to 95 parts by weight relative to 100 parts by weight of the total of component (A) and component (B), which are materials having a polymerizable group, or the total of component (A), component (B), and component (C), more preferably 5 to 80 parts by weight, and particularly preferably 10 to 70 parts by weight. When the mixing ratio of component (B) is less than 1 part by weight, the release properties of the cured coating might deteriorate, and when it is more than 95 parts by weight, the viscosity of the composition is not sufficiently low.

The mixing ratio of component (C) is preferably 0.01 to 5 parts by weight relative to 100 parts of the total of the polymerizable mixture of component (A) and component (B), or component (A), component (B), and component (D). When the mixing ratio of component (C) is less than 0.01 parts by weight, even when the polymerization initiator is activated by the action of radiation, the ring-opening reaction of the ring-opening polymerizable groups might not proceed satisfactorily, and the release properties after polymerization might not be satisfactory. Furthermore, when component (C) is mixed at more than 5 parts by weight, the polymerization-promoting action is not further enhanced, whereas the release properties might be degraded.

The mixing ratio of component (E) can be in the range of 0 to 1000 parts by weight, and preferably 10 to 500 parts by weight relative to 100 parts by weight of component (C). When the mixing ratio of component (E) is more than 1000 parts by weight, the polymerization-promoting action is not further enhanced, whereas a component that cannot be involved in the photoreaction might remain in the release agent, thus degrading the release properties.

The curable composition of the present invention can contain, as necessary, a powder such as fumed silica, precipitated silica, or spherical polymethylsilsesquioxane particles; a sensitizer such as benzophenone, thioxanthone, aminoxanthone, benzoflavine, 9,10-diethylanthracene, acridine orange, acridine yellow, or phosphine R; etc.

The curable composition of the present invention can be used without any solvent, but it can also be diluted with a solvent in some cases. Examples of the solvent include hydrocarbon solvents such as toluene and xylene; and alcohol solvents such as ethyl alcohol, isopropyl alcohol, and butyl alcohol, and because of excellent solubility and coating performance alcohol solvents are preferable.

A separator having a release layer on the surface of a substrate can be prepared by coating the curable composition of the present invention on the surface of the substrate and curing it by exposure to radiation such as, for example, ultraviolet radiation. The separator referred to here includes one in any application configuration such as one that has such a release agent layer formed on both sides or one side of a substrate and is used by inserting it between materials that are to be released, and one that has a release layer formed on one side of a substrate and is used opposite an adhesive layer of a sheet. With regard to the substrate, there are papers such as kraft paper, glassine paper, and parchment paper; plastic films such as polyethylene, polypropylene, and polyethylene terephthalate; and laminates such as polyethylene laminated paper. Coating can be carried out by a method in which the photocurable composition of the present invention is used without any solvent or, if necessary, as a solution in the above-mentioned solvent, by means of any equipment such as gravure, roll coater, knife coater, or Meyer bar.

Irradiation with ultraviolet radiation can be carried out by a standard method using as a light source a high-pressure mercury lamp, a low-pressure mercury lamp, a metal halide lamp, etc.

In particular, the release agent of the present invention can greatly reduce the viscosity of the composition while maintaining the release properties of a conventional release agent in which a polyorganosiloxane is used as a photoreactive polymer. The curable composition of the present invention shows excellent curing properties, and the release agent obtained therefrom exhibits good adhesion to various types of plastic substrates without subjecting them to a surface treatment. The composition of the present invention has excellent migration resistance so that no agent migrates from the cured separator to the substrate. The separator of the present invention is particularly useful in applications where a low release force is required. Furthermore, changing the component ratio of the radiation curable composition of the present invention can control the release force as desired.

As disclosed by the present invention, by mixing a polyorganosiloxane having radiation reactivity and an oxetane monomer having an alkyl group, a release agent having low viscosity, excellent thin film coating properties, and at the same time excellent curing properties by radiation and, in particular, ultraviolet radiation, can be obtained. The separator using this release agent exhibits excellent release properties.

EXAMPLES

The present invention is explained in further detail below by means of examples and comparative examples. The present invention is not limited by these examples. In all of these examples, 'parts' denotes 'parts by weight', and the viscosity is a value measured at 25° C.

Examples 1 to 3, Comparative Example 1

As component (A) the polyorganosiloxane UV9300 (manufactured by GE Toshiba Silicones Co., Ltd.), which has a 2-(3,4-epoxycyclohexyl)ethyl group, as components (B) the oxetane monomer OXT-212 (manufactured by Toagosei Co., Ltd.) represented by formula (2) above in which $R_3$ and $R_4$ are hydrogen atoms and $R_5$ is a 2-ethylhexyl group having 8 carbons, and the oxetane monomer OXR-18 (manufactured by Toagosei Co., Ltd.) in which $R_3$ and $R_4$ are hydrogen atoms and $R_5$ is an octadecyl group having 18 carbons, as component (C) bis(dodecylphenyl iodonium) hexafluoroantimonate, which is an iodonium salt photolatent cationic initiator, and as component (D) OXT-221 (manufactured by Toagosei Co., Ltd.) represented by formula (6) above, were uniformly mixed at 40° C. at the component ratios shown in Table 1 to give compositions of Examples 1 to 3, and a composition of Comparative Example 1 was prepared using only a polyorganosiloxane having an oxirane ring as a functional group. Samples were prepared using these compositions by the following method and evaluated.

Sample Preparation

Each of the compositions of the examples and the comparative example was applied to a polyethylene terephthalate (PET) film (thickness: 50 μm) using a bar coater to give an approximately 4 μm thick coating. This was subjected to cationic polymerization by placing it on a conveyor which was irradiated with ultraviolet radiation using a 120 W/cm focused high pressure mercury lamp (lamp height: 10 cm) at a conveyor speed of 5 m/min and passing it once to cure the composition and give a release agent. After curing, the release agent was subjected to each of the tests below.

Evaluation Test Methods

Curing Properties

The surface state of the release agent formed by subjecting the composition to irradiation with ultraviolet radiation was evaluated.

Good . . . No surface tack.
Fair . . . Slight surface tack.
Bad . . . Some surface tack.

Measurement of Release Force

Measured according to JIS Z-0237. After curing, the release agent was aged at room temperature for 1 day, and a pressure sensitive adhesive tape (for example, the product named Nitto 31B tape (width 1.9 cm, manufactured by Nitto Denko Corporation) was attached to the coating surface and compression bonded by a double pass with a 2 kg roller. The release force for the pressure sensitive adhesive tape was measured by peeling off the adhesive tape at 180 degrees at a speed of 0.3 m/min, at an ambient temperature of 23° C. and a humidity of 65%.

Measurement of Percent Residual Adhesion

After curing, the release agent was aged at room temperature for 1 day, and Nitto 31B tape (as above) was attached to the coating surface and left at 70° C. for 20 hours with a load of 20 g/cm². This tape was then peeled off, the tape so peeled off was attached to a stainless sheet (JIS C2107), compression bonded with a 2 kg rubber roller, and aged at 25° C. for 3 hours. After aging, this pressure sensitive adhesive tape was pulled at 180 degrees, and the release force (f) was measured. As a control sample, Nitto 31B tape (as above) was bonded to a polytetrafluoroethylene film, and the release force (f0) was measured using the same procedure as above. The residual adhesion (%) was calculated using the following equation.

$$\text{Residual adhesion } (\%) = (f/f0) \times 100$$

Migration Properties

After curing, the release agent was aged at room temperature for 1 day, and a 25 μm thick polyethylene terephthalate film was superimposed on the surface of the coating and compression bonded at room temperature with a load of 10 kg/cm² for 1 hour. This polyethylene terephthalate film was then peeled off, a line was drawn using an oil-based felt-tip pen (for example, the product named Magic Ink) on the film, and the ink repellency was evaluated.

Good . . . Not repelled.
Fair . . . Slightly repelled.
Bad . . . Repelled.

Adhesion

Immediately after irradiation with ultraviolet radiation, the release agent was rubbed strongly with a finger, and the extend to which it came off was evaluated.

Good . . . None came off.
Fair . . . Came off slightly.
Bad . . . Came off to a great extent.

Zipping

After aging the release agent at room temperature for 1 day, Nitto 31B tape was attached to the surface of the coating and left at 70° C. for 20 hours with a load of 20 g/cm², the tape was then peeled off quickly, and the level of sound generated during this was evaluated.

Excellent . . . No release sound.
Good . . . Slight release sound.
Fair . . . Some release sound.
Bad . . . Loud release sound.

The curing properties of the compositions of the present invention and the results of evaluation of the release agents are given in Table 1.

TABLE 1

|  | Example | | | Comp. Ex. |
| --- | --- | --- | --- | --- |
|  | 1 | 2 | 3 | 1 |
| Composition (parts) | | | | |
| UV9300 | 70 | 50 | 20 | 100 |
| OXT-212 | 30 | 10 | 30 | — |
| OXR-18 | — | 20 | 20 | — |
| OXT-221 | — | 20 | 30 | — |
| UV9380C | 1 | 1 | 1 | 1 |
| Evaluation results | | | | |
| Viscosity (mPa · s) | 120 | 59 | 16 | 315 |
| Curing properties | Good | Good | Good | Good |
| Release force (gf/5 cm) | 4.1 | 3.5 | 3.7 | 7.3 |
| Residual adhesion (%) | 98 | 102 | 96 | 94 |

TABLE 1-continued

| | Example | | | Comp. Ex. |
|---|---|---|---|---|
| | 1 | 2 | 3 | 1 |
| Migration properties | Good | Good | Good | Good |
| Adhesion | Good | Good | Good | Good |
| Zipping | Excellent | Excellent | Excellent | Excellent |

Compounds in Table 1
UV9300: Polyorganosiloxane UV9300, which has a 2-(3,4-epoxycyclohexyl)ethyl group (manufactured by GE Toshiba Silicones Co., Ltd.).
OXT-212: 3-Ethyl-3-(2-ethylhexysiloxymethyl)oxetane (manufactured by Toagosei Co., Ltd.).
OXR-18: 3-Ethyl-3-(octadecanyloxymethyl)oxetane (manufactured by Toagosei Co., Ltd.).
OXT-221: Di[1-ethyl(3-oxetanyl)]methyl ether (manufactured by Toagosei Co., Ltd.)
UV9380C: Bis(dodecylphenyl iodonium) hexafluoroantimonate As is clear from Table 1, the compositions of the present invention formed by mixing a polyorganosiloxane containing a cationically polymerizable functional group, which is component (A), and an oxetane monomer having an alkyl group, which is component (B), had low viscosity and could, by a short period of irradiation with ultraviolet radiation, be made into release agents having good curing properties, excellent release properties, and generating no zipping, and excellent separators could be obtained.

Example 4 and Comparative Example 2

As component (A) the polyorganosiloxane XS56-A2982, which has a 2-(3,4-epoxycyclohexyl)ethyl group (manufactured by GE Toshiba Silicones Co., Ltd.), as component (B) the oxetane monomer OXT-212, as component (C) bis(dodecylphenyl iodonium) hexafluoroantimonate, which is an iodonium salt photolatent cationic initiator, and as component (D) OXT-221, were uniformly mixed at 40° C. at the component ratios shown in Table 2 to give compositions of Example 4 and Comparative Example 2. Samples were prepared by the above-mentioned method using these compositions and the evaluation results are given in Table 2. With regard to the sample of Comparative Example 2, there was insufficient adhesion and the coating peeled off in the zipping test, and a measurement could not be made.

TABLE 2

| | Example 4 | Comp. Ex. 2 |
|---|---|---|
| Composition (parts) | | |
| XS56-A2982 | 20 | 100 |
| OXT-212 | 40 | — |
| OXT-221 | 40 | — |
| UV9380C | 1 | 1 |
| Evaluation results | | |
| Viscosity (mPa · s) | 26 | 720 |
| Curing properties | Good | Good |
| Release force (gf/5 cm) | 78.9 | 84.2 |
| Residual adhesion (%) | 92 | 85 |
| Migration properties | Good | Fair |
| Adhesion | Good | Bad |
| Zipping | Good | Could not be measured |

Compounds in Table 2 (see Table 1 for others)
XS56-A2982: Polyorganosiloxane having a 2-(3,4-epoxycyclohexyl)ethyl group (manufactured by DE Toshiba Silicones Co., Ltd.)

As described in Table 2, use of the composition of the present invention can give excellent adhesion to the substrate and suppress migration of the agent from the cured separator. Furthermore, adjusting the mixing ratio of the composition of the present invention can control the release force.

What is claimed is:

1. A radiation curable composition comprising:

(A) a polyorganosiloxane represented by the average unit formula below:

$$(R_1)_m(R_2)_n SiO_{(4-m-n)/2} \quad (1)$$

in formula 1, the $R_1$ groups each denote a substituted or unsubstituted monovalent hydrocarbon group having no cationic ring-opening polymerizable group, the hydrocarbon groups may be identical to or different from each other, and a part thereof may be a hydrogen atom, a hydroxyl group, or an alkoxyl group having 1 to 4 carbons; the $R_2$ groups each denote an alkyl group to which is bonded a cyclic ether group having cationic ring-opening polymerizability, the alkyl groups may be identical to or different from each other, and they may have an alicyclic alkyl group; n is 0.0004 to 1.0; and m is a figure such that the total of m+n is 1.2 to 2.2, the polyorganosiloxane having at least two cationic ring-opening polymerizable cyclic ether groups in the molecule, and the number of silicon atoms in the polyorganosiloxane being 10 to 1,000;

(B) a monofunctional oxetane monomer represented by formula (2) below

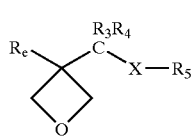

(2)

in formula 2, $R_3$ and $R_4$ denote hydrogen atoms or straight- or branched-chain alkyl groups having 1 to 4 carbons, which may have a substituent, $R_5$ denotes a straight- or branched-chain alkyl group having 6 to 18 carbons, $R_6$ denotes a hydrogen atom or an alkyl group having 1 to 4 carbons, and X denotes methylene or an oxygen atom; and (C) a cationic polymerization initiator.

2. The radiation curable composition according to claim 1 further comprising:

(D) a polyfunctional monomer having at least two ring-opening polymerizable cyclic ether groups.

3. The radiation curable composition according to claim 2 wherein the polyfunctional monomer (D) has two oxetanyl groups and is represented by formula (3) below:

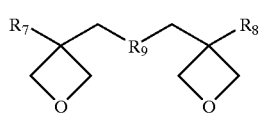

(3)

in formula (3), $R_7$ and $R_8$ denote hydrogen atoms, alkyl groups having 1 to 4 carbons, or substituted hydrocarbon groups, and $R_9$ denotes formula (4) below:

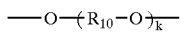 (4)

in formula (4), k is an integer of 0 to 5, and when k is 1 to 5, $R_{10}$ denotes a straight- or branched-chain hydrocarbon group having 2 to 12 carbons.

4. The radiation curable composition according to claim 1 further comprising:

(E) a radical polymerization initiator.

5. The radiation curable composition according to claim 2 further comprising:

(E) a radical polymerization initiator.

6. The radiation curable composition according to claim 3 further comprising:

(E) a radical polymerization initiator.

7. The radiation curable composition according to claim 1 wherein the hydrocarbon groups denoted by $R_1$ are alkyl groups having 1 to 18 carbons, cycloalkyl groups having 3 to 18 carbons, alkylene groups having 2 to 18 carbons, aryl groups having 6 to 18 carbons, or aralkyl groups having 7 to 18 carbons.

8. The radiation curable composition according to claim 1 wherein at least 85% of the entire $R_1$ groups are methyl.

9. The radiation curable composition according to claim 1 wherein $R_2$ is an oxirane group or an oxetanyl group.

10. The radiation curable composition according to claim 1 wherein $R_2$ is a 2-(3,4-epoxycyclohexyl)ethyl group.

11. The radiation curable composition according to claim 1 wherein n is 0.001 to 0.4 and m+n is 1.2 to 2.2.

12. The radiation curable composition according to claim 1 wherein $R_3$ and $R_4$ are hydrogen atoms or haloalkyl groups having 1 to 4 carbons, $R_5$ is a straight- or branched-chain alkyl group having 6 to 18 carbons, and $R_6$ is methyl or ethyl.

13. The radiation curable composition according to claim 3 wherein $R_7$ and $R_8$ are independently hydrogen atoms, alkyl groups having 1 to 4 carbons or haloalkyl groups having 1 to 4 carbons, (1) k is 0, or (2) k is 1 to 5 and $R_{10}$ is an alkylene or arylalkylene group having 2 to 12 carbons.

14. The radiation curable composition according to claim 4 wherein the radical polymerization initiator is benzoin ether, benzyl dimethyl ketal, an α-hydroxyalkylphenone, or an acylphosphine oxide.

15. The radiation curable composition according to claim 4 wherein the radical polymerization initiator is an α-hydroxyalkylphenone.

16. The radiation curable composition according to claim 1 wherein the mixing ratio of component A is 5 to 80 parts by weight relative to 100 parts by weight of the total of component A and component B, and the mixing ratio of component C is 0.01 to 5 parts by weight relative to 100 parts of the total of component A and component B.

17. The radiation curable composition according to claim 1 wherein the mixing ratio of component E is 10 to 500 parts by weight relative to 100 parts by weight of component C.

18. A process for producing a separator comprising:

coating a surface of a substrate with the radiation curable composition according to claim 1; and then curing the composition by exposure to radiation.

19. A separator obtained by coating a substrate with the radiation curable composition according to claim 1, and then curing the composition by exposure to radiation.

20. The separator according to claim 19 wherein the radiation is ultraviolet radiation.

* * * * *